United States Patent [19]

Koeppe et al.

[11] 4,080,429
[45] Mar. 21, 1978

[54] METHOD OF AND APPARATUS FOR SEPARATING KRYPTON FROM RADIOACTIVE WASTE GASES

[75] Inventors: Werner Koeppe; Josef Bohnenstingl; Stanislaus Gottfried Josef Mastera, all of Julich, Germany

[73] Assignee: Kernforschungsanlage Julich Gesellschaft mit beschrankter Haftung, Julich, Germany

[21] Appl. No.: 583,156

[22] Filed: Jun. 2, 1975

[30] Foreign Application Priority Data

Jun. 1, 1974 Germany ............................ 2426764

[51] Int. Cl.$^2$ ............................................ C01B 23/00
[52] U.S. Cl. .......................................... 423/262; 62/22;
62/23; 55/66; 55/74; 176/37; 252/301.1 W;
423/210; 423/249; 423/219; 423/235; 423/245;
423/220
[58] Field of Search ....................... 423/262, 210, 249;
62/22, 23; 252/301.1 W; 55/66, 74; 176/37

[56] References Cited

U.S. PATENT DOCUMENTS

| 3,203,866 | 8/1965 | Lehmer et al. ......................... 176/37 |
| 3,404,067 | 10/1968 | Rendos ................................... 176/37 |
| 3,748,864 | 7/1973 | Lofredo et al. .......................... 62/22 |
| 3,829,551 | 8/1974 | Stein ..................................... 423/262 |
| 3,922,150 | 11/1975 | Yusa et al. ............................. 55/74 |
| 4,012,490 | 3/1977 | Lefredo ................................. 176/37 |

OTHER PUBLICATIONS

Bendixsen et al., "Chemical Engineering", vol. 78, No. 22, Oct. 4, 1971, pp. 55–57.

Primary Examiner—Herbert T. Carter
Attorney, Agent, or Firm—Walter Becker

[57] ABSTRACT

A method of and apparatus for separating krypton from radioactive waste gases which become free during the chemical dissolution of burnt-off fuel particles and contain krypton and xenon. Simultaneously with the core fuel particles conveyed to the chemical dissolution, such quantity of chemically inactive carrier gas intermixable with the waste gases is added to the substances bringing about the chemical dissolution that after purification of the waste gas mixture from gas components such as oxygen, carbon dioxide, nitrous oxide, hydrocarbons and water steam and after subsequent cooling of the waste gas mixture to the boiling temperature of the liquid nitrogen, the quantity of xenon contained in the waste gas mixture is quantitatively precipitated in solid form. Thereupon the waste gas mixture is cooled by means of liquid nitrogen, while simultaneously increasing the pressure, to such an extent that krypton is precipitated. The apparatus for practicing the above mentioned method is characterized primarily in that a chamber communicating with a supply for the fuel particles and for carrier gas and equipped with a conveying device is provided with a connection to a dissolver. In a waste gas conduit connected to the dissolver are inserted in series a waste gas purifier, a nitrogen cooled container for separating solid xenon, a compressor for subjecting the waste gas mixture to a pressure of approximately 4 bars, and a nitrogen cooled separator for krypton with following shut-off device.

5 Claims, 6 Drawing Figures

METHOD OF AND APPARATUS FOR SEPARATING KRYPTON FROM RADIOACTIVE WASTE GASES

The present invention relates to a method of separating krypton from radioactive waste gases which become free during the chemical dissolution of burned-off core fuel particles and which contain krypton and xenon, and also concerns a gas separation plant for practicing said method.

When regenerating fuel elements, the core or nuclear fuel particles are chemically dissolved in order to separate the fission products or the disintegration products thereof, which form during the reactor operation, from the fuel and/or breeder elements usable again for making fuel elements. A portion of the fission products is formed by the gases krypton and xenon which are contained in the waste gas of the chemical dissolver. To blow off the waste gas into the atmosphere is, due to the radioactive isotope Kr$^{85}$ contained in the krypton and comprising a half-value or half decay time of 10.3 years, not tolerable in an unlimited manner.

Therefore, it is necessary to store the waste gases occurring during the chemical dissolution of the core fuel particles, until the radioactivity has dropped to a minimum which is sufficiently safe. For storing the waste gases, considerable space is required. The krypton component in the waste gas is, however, relatively small. With reference to the xenon volume, the krypton volume is only approximately 15/85. When depositing the entire waste gas which is generated during the chemical dissolution of the core fuel particles, the major portion of the storage spaces have to be made available for such gas components the nature of which is not dangerous for the surroundings. This space requirement is rather uneconomical and represents a considerable disadvantage.

It is, therefore, an object of the present invention to provide a method of and device for separating krypton from waste gases which become free during the chemical dissolution of core fuel particles to be generated, and which method and device will permit a continuous removal of the krypton gas from the waste gas mixture.

This object and other objects and advantages of the invention will appear more clearly from the following specification in connection with the accompanying drawings, in which.

Figure 2:
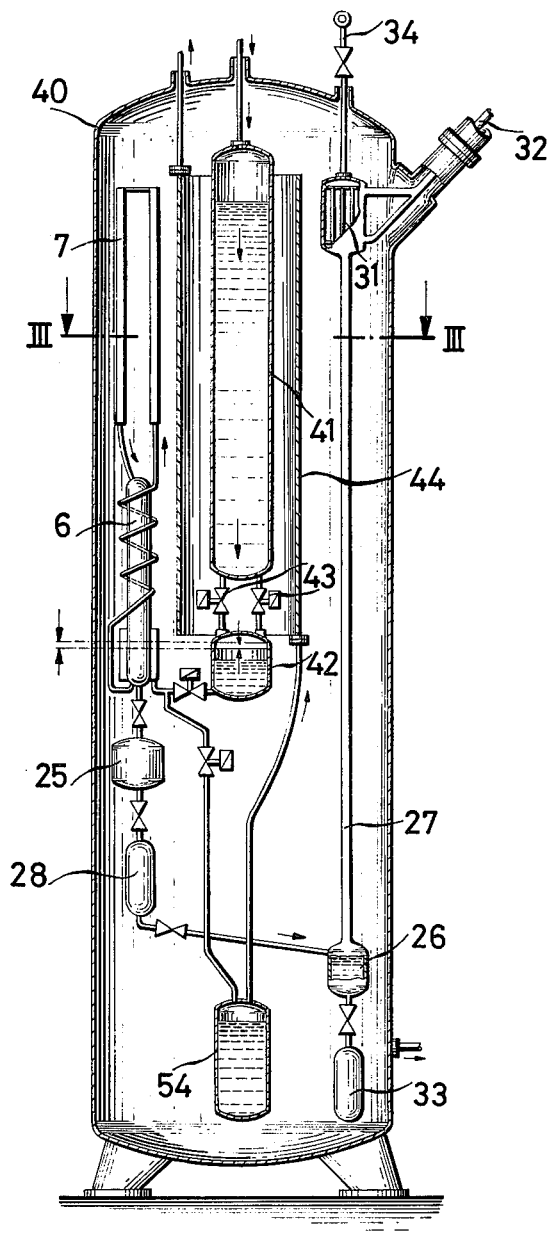
FIG. 2 shows the heat insulating container for the containers for separating solid xenon and for the separators for krypton according to FIG. 1
Figure 3:
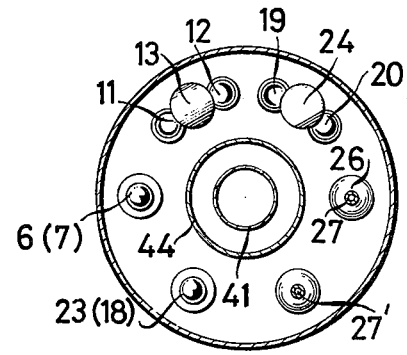

FIG. 3 diagrammatically illustrates a cross section through the container of FIG. 2, said section being taken along the line III—III of FIG. 2.

Figure 4:
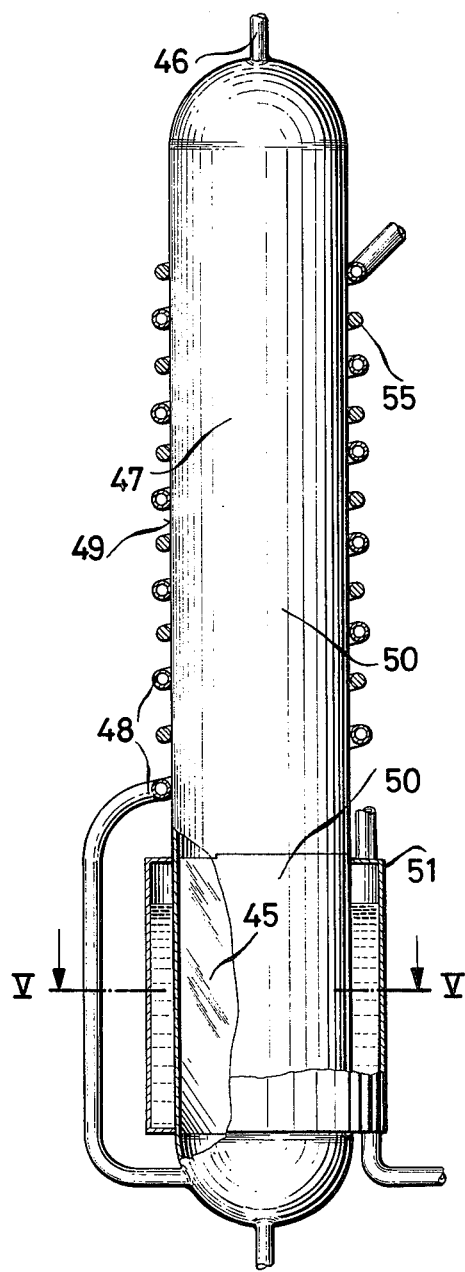

FIG. 4 diagrammatically illustrates a container with cooling mantle for separating solid xenon or solid krypton.

Figure 5:
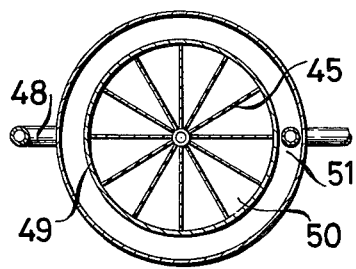

FIG. 5 represents a cross section through the container taken along the line V—V of FIG. 4.

Figure 6:
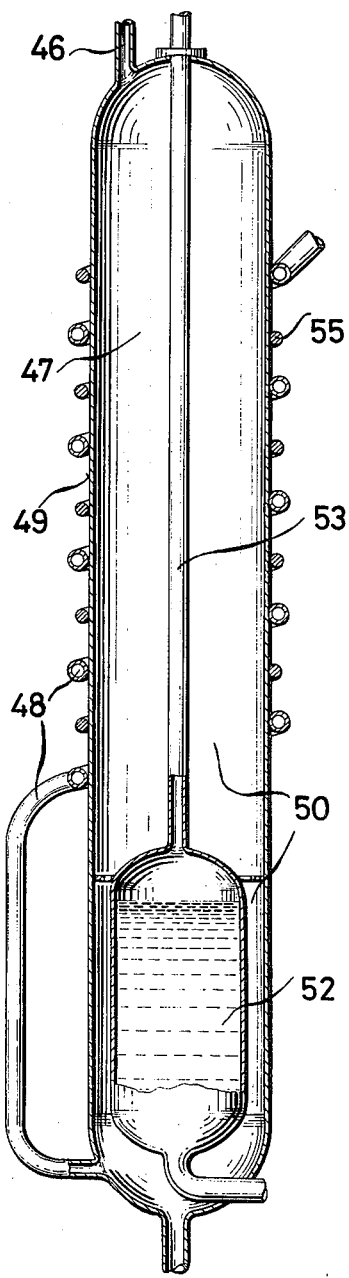

FIG. 6 diagrammatically illustrates a container with inner cooling medium bladder or still for separating solid xenon or solid krypton.

The method according to the invention is characterized primarily in that to the substances bringing about the chemical dissociation, disintegration or dissolution, there is simultaneously together with the core fuel particles added to the chemical dissolution such a quantity of chemically inactive carrier gas which mixes with the waste gases that after purificiation of the waste gas mixture of gas components such as oxygen, carbon dioxide and nitrous oxide as well as hydrocarbons and water steam and subsequent cooling of the waste gas mixture to the boiling temperature of the liquid nitrogen the quantity of xenon contained in the waste gas mixture is precipitated quantitatively in solid form and that subsequently thereto the waste gas mixture is by means of liquid nitrogen with simultaneous increase in pressure cooled to such an extent that krypton is separated.

By the addition of carrier gas during the chemical dissociation, disintegration or dissolution of the core fuel particles, two things are accomplished according to the invention: on one hand, it will be prevented that during the chemical dissociation, disintegration or dissolution which is carried out in the low underpressure in order to prevent an uncontrolled discharge or escape of radioactive waste gases, greater quantities of air are supplied. The oxygen components of the air due to the gamma rays of the isotope Kr$^{85}$ will contribute to the formation of ozone so that with greater quantities of ozone, a considerable explosion danger would exist. On the other hand, due to the slight quantity of carrier gas, the total partial pressure for krypton and xenon is reduced to such an extent that during the first subsequent cooling of the gas mixture by means of liquid nitrogen, xenon is precipitated in solid form. Prior to the cooling-off of the waste gas mixture by means of liquid nitrogen, according to the method of the present invention, there is provided in an advantageous manner a purification of the waste gas mixture of such gas components as oxygen, carbon dioxide, nitrous dioxide, and hydrocarbons such as water steam which would cause a freezing of the devices in response to a cooling-off with liquid nitrogen. Due to the precipitation of xenon in solid form, not only will the quantity of waste gas contained in krypton be considerably reduced, but it is also advantageous that the precipitated xenon can be used economically as a product. Heretofore, a natural appearance of xenon has been known only in the atmospheric air. In the air, xenon is contained in very minute quantities, namely in quantities of $8.6 \times 10^{-6}\%$ by volume. The method according to the invention opens up a new source of xenon which not only brings about a reduction in price of the industrially interesting xenon gas but also considerably increases the economy of the method according to the invention for separating krypton.

In order during the separation of xenon in addition to the krypton dissolved in the solid xenon, to freeze out only as little krypton as possible, it is expedient to keep the partial pressures of krypton and xenon in the waste gas mixture as low as possible. It has proved advantageous to add to the waste gas such a quantity of carrier gas that the total partial pressure of krypton and xenon will be reduced to about 16.7 mb. With such a pressure, in addition to the krypton dissolved in solid xenon, additionally only 0.35% by volume of krypton is precipitated. As carrier gas, helium is used advantageously.

A further development of the method according to the present invention consists in that from the waste gas mixture a portion of the krypton content therein is precipitated in solid form, and that the remaining waste gas mixture is substantially conveyed into an adsorber which consists of active carbon and is cooled by liquid nitrogen. On the active carbon, the residual krypton and gas components, still contained in the waste gas such as nitrogen and argon, adsorb so that from the adsorber highly purified carrier gas flows off which expediently is again utilized with the chemical dissolution of the core fuel particles. The expert or average man skilled in the art is sufficiently aware of the chemical dissolution process of nuclear fuel particles as preconditioned for the present invention with the regeneration of fuel elements.

For the economic exploitation of the obtained xenon, it is advantageous to purify the precipitated xenon quantity from the krypton contained in xenon. This is expediently effected by rectification. In this connection, the quantity of krypton still contained in the precipitated xenon is reduced to such an extent that utilization of the xenon is possible without a danger due to radioisotopes.

A gas separating plant to be connected to a regenerating plant for core fuels for carrying out the method according to the invention is characterized in that there is provided a chamber with a connection to the dissolver, said chamber being in communication with a supply for the fuel particles and for the carrier gas. The plant is furthermore characterized in that in a waste gas conduit connected to the dissolver there are successively interposed a gas purifier, a nitrogen cooled container for precipitating solid xenon, a compresser conveying the waste gas mixture to a pressure of approximately four bars, and a nitrogen cooled separator for krypton with subsequent shut-off valve inserted in the waste gas conduit.

Figure 1:
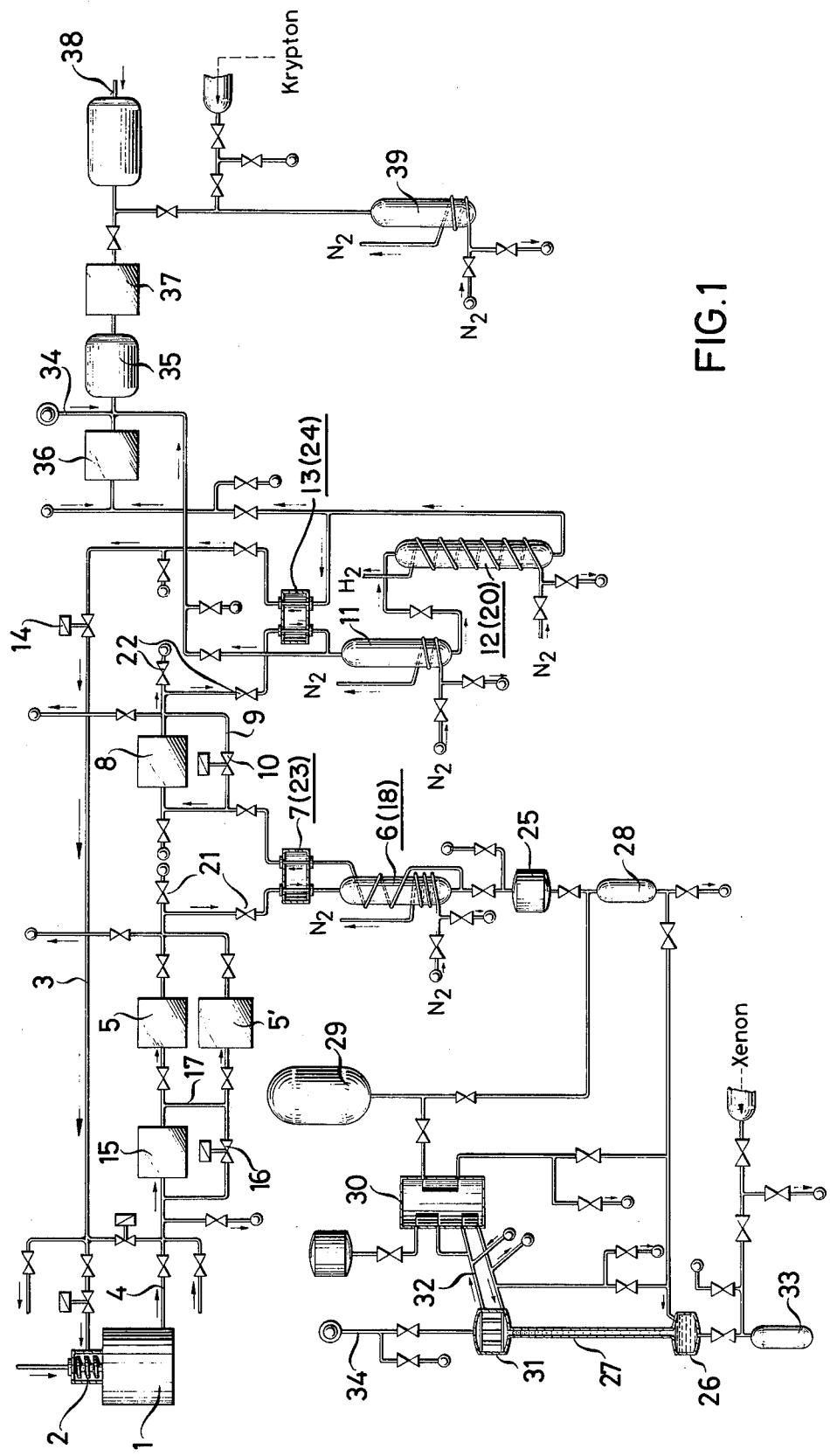
FIG. 1 is a flow sheet of the gas separating plant according to the invention.

Referring now to the drawings in detail, it will be seen from FIG. 1 that the helium employed as carrier gas in the gas separating plant is conveyed to a chemical dissolver 1 through a chamber 2 which is connected to a supply for the core or nuclear fuel particles and comprises a conveying device. The carrier gas flows from a return conduit 3 of the gas separating plant into the chamber 2 and together with the gases generated in the chemical dissolver 1 forms, especially with krypton and xenon, a waste gas mixture. In addition to helium as carrier gas and krypton and xenon, the waste gas mixture contains above all oxygen, carbon dioxide, nitrous oxides, hydrocarbons and water steam as well as small components of nitrogen and argon. The waste gas mixture is withdrawn from the dissolver 1 through a waste gas conduit 4. In order to prevent a freezing of the devices during the cooling-off of the waste gas mixture by means of the liquid nitrogen, the waste gas mixture is first purified in a waste gas purifier 5 of such waste gas components which during the cooling-off would condense. Additionally, oxygen is removed in order in the gas separating plant to substantially prevent the generation of explosive gas mixtures. The waste gas purification is effected by means of methods known per se. For instance, oxygen and hydrocarbons can be removed from the waste gas mixture by catalytic combustion, carbon dioxide and nitrous oxides in suitable washers, and water steam in molecular screen adsorbers. During the regeneration period of the waste gas purifier 5, the waste gas mixture is conveyed to a waste gas purifier 5' which is arranged in parallel to the waste gas purifier 5. The gas which is discharged from the waste gas purifier 5,5' consists primarily only of helium, krypton, xenon and minor quantities of nitrogen and traces of argon.

From the waste gas purifier 5, 5', the waste gas mixture is conveyed into a nitrogen cooled container 6 for purposes of separating solid xenon at the boiling temperature of the liquid nitrogen. In order to keep the thermal losses of the plant as low as possible, it is advantageous that there is provided a heat exchanger 7 which is passed through by a waste gas mixture that is conveyed to the container 6 for precipitating solid xenon and is withdrawn from the container 6. The heat exchange between the gases is effected in counter current flow in the heat exchanger 7. The heat exchanger 7 is expediently so designed that the temperature of the waste gas mixture flowing into the container 6 is about 20° K above the temperature at which the freezing of xenon in container 6 starts so that a freezing of the gas conduits is safely avoided. The nearly xenon-free waste gas mixture is withdrawn from the container 6 by the compressor 8. The compressor 8 compresses the waste gas mixture to a pressure of at least 4 bars. For purposes of controlling the gas through-put, the compressor 8 is provided with a bypass line 9 with a control device 10, said bypass line 9 connecting the high pressure and low pressure sides of said compressor 8. The compressed waste gas mixture flows into a separator 11, 12 for krypton. This separator, in conformity with the specific embodiment shown, comprises a container 11 which is cooled by means of nitrogen and which is intended for separating solid krypton. The separator 11, 12 furthermore comprises a nitrogen cooled adsorber 12. The adsorber 12 is filled with active carbon. An economical manner of operation of the plant will be assured by the fact that there is provided a heat exchanger 13 which is passed through by a waste gas mixture conveyed to the separator 11, 12 for krypton and withdrawn from the separator 11, 12.

In the adsorber 12 which is filled with active carbon, not only the residual krypton is retained but also the gas components nitrogen and argon still contained in the waste gas are retained. Therefore, greatly purified helium flows from the adsorber 11 and as a carrier gas is after expansion in a shut-off member 14, inserted in the waste gas conduit 4, through the return conduit 3 after passing through the container 2 returned into the chemical dissolver 1 in a cycle or circulation. According to a further advantageous development of the gas separating plant according to the invention, a compressor 15 is, when viewing in the direction of flow of the waste gas mixture, arranged ahead of the waste gas purifier 5. The compressor 15 is provided with a bypass line 17 which connects the high pressure and low pressure sides of the compressor through an intermediate control member 16. The compressor 15 draws the waste gas mixture from the chemical dissolver 1. The maximum gas pressure occurring in the high pressure side of the compressor 15 can be adjusted by means of the control member 16 in the bypass line 17. This adjustment occurs in an advantageous manner so that during the cooling-off of the gas mixture in the nitrogen cooled container 6 already an effective separation between xenon and krypton can be obtained.

When a sufficient quantity of xenon and krypton respectively has deposited in the container 6 and in the separator 11, 12, the gas feeding lines are shut off and the devices are regenerated. In order to make sure that during the regeneration period the required continuous separation of krypton from the waste gases forming in the chemical dissolver will not be interrupted, a further development of the gas separating plant according to the invention provides that in parallel arrangement to the container 6 for separating solid xenon and in parallel arrangement to the separator 11, 12 for krypton there are provided both at least one additional container 18 for separating solid xenon and also at least one further separator 19, 20 for krypton. In this connection, there are provided through-flow members 21, 22 which alternately guide the gas flow into one of the said containers and into one of the separators respectively. Each of the additional containers are preceded by separate heat exchangers 23, 24 for separating solid xenon and each separator 19, 20 for krypton, so that also the heat exchangers are respectively within the regeneration period purified from condensation products which might have deposited.

For purposes of obtaining the separated xenon from one of the containers 6, 18, the respective container to be regenerated is heated to a temperature of approximately from 160°–165° K, and the liquified mass composed of xenon and minor components of krypton is conveyed through a quantity measuring device 25 into a bladder or still 26 of the rectifying column 27. The rectifying column 27 is expediently so designed that its still can hold the quantity of xenon separated in the gas separating plant during one day. For an intermediate storing of the quantities of xenon in the containers 6, 18, the liquid xenon conveyed from the containers first into a pressure bomb 28 from which after being heated up further, the xenon quantities are conveyed as a gaseous product into a storage container 29. If a quantity of gas corresponding to the content of the rectifying column has collected in the storage container 29, the xenon after a renewed condensation by means of a refrigerating device 30, in a liquid form is introduced into the still 26 of the rectifying column 27.

The rectification is effected at a pressure of from 2 to 3 bars and at a temperature of approximately 162° K at the condenser 31 of the rectifying column 27. The required cooling output is generated by the refrigerating plant 30 while for cooling the condenser 31, xenon is utilized which is liquified in the refrigerating plant and is passed through the pipeline 32 between the condenser and the refrigerating plant in a cycle or circulation.

While from the still 26 of the rectifying column 27 nearly krypton-free xenon can be filled through a pressure bomb 33 into the transport container (xenon bottle), gaseous krypton escapes from the condenser 31 this krypton flows in a conduit 34 to the intermediate storage device 35. In the intermediate storage device 35 also the krypton is collected which is precipitated in the containers 11, 19 and the adsorbers 12, 20. The transfer of the krypton is effected by evaporating the separated quantity of solid material. The respective container to be regenerated, for instance the container 11, is heated to approximately 120° K and the respective adsorber to be regenerated, for instance the adsorber 12, is heated to 190° K. The desorption of the solid materials in the adsorber is aided by generating a vacuum by means of a vacuum pump 36. Expediently, the capacity of the containers 11, 19 and of the adsorbers 12, 20 is designed for a one-day's production. The krypton which contains slight admixtures of nitrogen and argon, by means of a compressor 37 is withdrawn from the intermediate storage device 35 and is pressed into a storage container 38. If sufficient krypton is present in the storage container 38, the krypton is condensed by means of a pressure bomb 39 cooled by liquid nitrogen and from said pressure bomb is filled into a safety container (krypton bottle).

A further advantageous development of the gas separating plant according to the invention is illustrated in FIG. 2. This plant is characterized in that the containers 6, 18 for separating solid xenon, and the separators 11, 12; 19,20 for krypton are arranged together in a heat insulated container 40. As heat insulating container there may expediently be used a vacuum tank. Centrally arranged in the container 40 is a supply vessel 41 for the liquid nitrogen required for cooling purposes. The charging of the device with liquid nitrogen is expediently effected in conformity with the principle of intercommunicating tubes. The constant liquid nitrogen level required for this purpose is maintained in a control vessel 42 which is filled through controllable shut-off valves 43 from the supply vessel 41. The supply vessel 41 and the control vessel 42 are surrounded by a radiation field 44 which is expediently cooled by nitrogen vapor which is discharged from a collecting vessel 54 for liquid nitrogen.

The rectifying columns 27, 27' are expediently arranged in the container 40.

FIGS. 4 and 6 diagrammatically indicate different embodiments of containers 6, 18 for separating solid xenon and embodiments of vessels 11, 19 for separating solid krypton. The containers are subdivided by radially arranged heat conducting cooper plates 45 into individual chambers which are passed through in axial direction by the waste gas mixture. The waste gas mixture flows at 46 into the upper portion of the container, the pre-cooling zone 47, and is precooled by the residual gas mixture which in counter flow to the waste gas mixture flows out of the freezing vessel. The residual gas mixture is passed through conduits 48 which are connected to the mantle 49 of the freezing-out vessel. The thus precooled waste gas mixture then passes into the freezing-out zone 50 in which the condensation of the gas components to be separated starts. In order in the freezing-out zone to have available as large separating surfaces as possible, the number of the copper plates 45 in the lower portion of the freezing-out zone 50 is twice that of the precooling zone 47. The cooling of the separating surfaces in the freezing out zone 50 is effected by means of a pipe mantle 51 filled with liquid nitrogen or, as illustrated in FIG. 6, by a cooling medium still 52 which is arranged in the interior of the freezing-out vessel and from which the evaporated quantity of nitrogen flows off through a pipeline 53 passing through the precooling zone 47.

During the regeneration phase, the liquid quantities of nitrogen which cool the freezing-out zone 50 are discharged into the collecting vessel or container 54. A fast thawing of the solid materials separated in the containers for separating solid xenon or in the vessels for separating solid krypton is effected by means of a heated spiral 55 extending around the mantle 49 of the containers and vessels respectively.

It is, of course, to be understood that the present invention is, by no means, limited to the specific showing in the drawings but also comprises any modifications within the scope of the appended claims.

What we claim is:

1. In a process of reprocessing nuclear fuel particles by chemical dissolution to separate fission products and the disintegration products which form during reactor operation from reusable fuel materials wherein during said dissolution waste gases containing oxygen, carbon dioxide, nitrous oxides, hydrocarbons, and steam, xenon and radioactive krypton are released, the method of separating xenon and radioactive krypton from said waste gases comprising the steps of: adding a chemically inactive carrier gas to said fuel particles during the chemical dissolution step, withdrawing said carrier gas mixed with said waste gas mixture released in said dissolution step, removing oxygen, carbon dioxide, nitrous oxides and hydrocarbons and steam from the gaseous mixture, cooling the resultant gas mixture comprising xenon, radioactive krypton and carrier gas by means of liquid nitrogen to first precipitate xenon as a solid, thereafter increasing the pressure of the substantially xenon-free gas mixture and further cooling by means of liquid nitrogen to substantially separate krypton from said mixture in solid form.

2. A method according to claim 1, in which said waste gas mixture during the further cooling thereof is subjected to an increased pressure of at least 4 bars.

3. A method according to claim 1, which includes the step of adding to the waste gases such a quantity of chemically inactive carrier gas that the total partial pressure of krypton and xenon is lowered to approximately 16.7mb.

4. A method according to claim 1, in which helium is utilized as the chemically inactive carrier gas.

5. A method according to claim 1, in which from the waste gas mixture only a portion of the krypton contained therein is separated in solid form and that the residual waste gas mixture is subsequently conveyed into an adsorber comprising active carbon while the latter is further cooled by liquid nitrogen.

* * * * *